United States Patent [19]

Jeffrey et al.

[11] Patent Number: 5,028,453
[45] Date of Patent: Jul. 2, 1991

[54] METHOD FOR REDUCING FOULING

[75] Inventors: Gareth C. Jeffrey, Bracknell; Malcolm T. McKechnie, Egham; David L. Perry, Bagshot, all of England

[73] Assignee: The British Petroleum Company p.l.c., London, England

[21] Appl. No.: 514,013

[22] Filed: Apr. 26, 1990

[30] Foreign Application Priority Data

Apr. 27, 1989 [GB] United Kingdom ................. 8909685

[51] Int. Cl.$^5$ ............................................. B05D 3/06
[52] U.S. Cl. ................................... 427/42; 427/45.1; 427/295; 427/296; 427/322; 427/324; 427/327
[58] Field of Search .................... 427/38, 42, 39, 45.1, 427/295, 296, 322, 324, 327

[56] References Cited

U.S. PATENT DOCUMENTS 4,743,662  5/1988  Lipowitz .......................... 427/39 X

FOREIGN PATENT DOCUMENTS 0194546  9/1986  European Pat. Off. .
2022357  7/1970  France .
WO88/05688  1/1988  PCT Int'l Appl. .
2089285  6/1982  United Kingdom .

OTHER PUBLICATIONS

Patent Abstracts of Japan, vol. 10, No. 219 (C-363)[2275], 31st Jul. 1986.
JP-A-61 57 221 (NOK Corp.) 24-03-1986.

Primary Examiner—Bernard Pianalto
Attorney, Agent, or Firm—Nixon & Vanderhye

[57] ABSTRACT

A method for reducing the tendency of a surface of a material to foul when exposed to a potential foulant comprises the step of treating the surface of the material with a plasma of a compound containing or generating hydroxyl groups to render the surface hydrophylic but substantially uncharged.

The materials may be inorganic, e.g. glass, or organic, e.g. polyamide, and may be in the form of fibers, woven fabrics, membranes or plates. Suitable compounds containing hydroxyl groups include ethylene glycol and water.

6 Claims, No Drawings

METHOD FOR REDUCING FOULING

This invention relates to a method for reducing fouling on surfaces of materials such as membranes and fibres.

Membranes and fibres are frequently used in phase separation techniques such as filtration, micro-filtration, ultra-filtration and reverse osmosis for the purification of water and other aqueous liquids or for the recovery of solids. During such operations there is sometimes a tendency for the separation medium to suffer from fouling wherein an unwanted layer builds up on the surface of the medium which results in a marked deterioration of performance, particularly when proteinaceous materials are present.

A specific example of this problem is the filtration of sea water for use in the secondary recovery of oil from offshore oil fields.

In this situation the sea water and its contents are generally subjected to severe shearing, e.g. by pumps, and the action of heat supplied to assist deoxygenation, before filtration. This gives rise to a proteinaceous and lipidic pulpy dispersion, resulting from marine organisms together with fine particles of inorganic material such as sand. This material is intractable, difficult to remove by filtration and quickly clogs conventional filter cloths. It is a gelatinous material of indeterminate composition of both organic and inorganic origin which adheres to filters and is difficult to remove by conventional back washing techniques.

Because of this, a large pressure drop quickly builds up across the filter and, as a further consequence of this, frequent regeneration of the filter becomes necessary with the result that the filter or a section of it is out of action for a high proportion of time. Furthermore, the material adheres so strongly to the filter cloth that conventional backwashing techniques are relatively inefficient in removing it and regeneration becomes a lengthy procedure.

We have now discovered that the tendency of a surface to foul is reduced if it is treated with a plasma of a compound containing hydroxyl groups.

Thus, according to the present invention, there is provided a method for reducing the tendency of a surface of a material to foul when exposed to a potential foulant which method comprises the step of treating the surface of the material with a plasma of a compound containing or generating hydroxyl groups to render the surface hydrophilic but substantially uncharged.

Suitable materials the surfaces of which can be treated include inorganic materials such as glass, ceramics, alumina, steel and carbon.

Other suitable materials include organic materials such as polycarbonate, polyketone, polyester, polyacrylate, polyacrylonitrile, polysulphone, polyether sulphone, polyamide, polyetherimide, polyvinylidene difluoride, cellulose, nitrocellulose and cellulose esters.

The materials may be in the form of fibres, woven fabrics, films, membranes, plates, discs, or tubes, but are not limited to these configurations.

Suitable compounds containing hydroxyl groups include diols, eg, ethylene glycol, triols or polyols containing 4 or less carbon atoms per molecule; monhydric alcohols containing 1-4 carbon atoms per molecule; and water.

The treatment may be effected by placing the material to be treated in an evacuated vessel through which the plasma of the treating compound is passed. The plasma can be generated in several different ways, e.g. by using direct current, low frequency alternating current, radio frequency or microwave radiation.

The treated surfaces are resistant to fouling, particularly to fouling by proteins in solution or dispersed form, oils and solid particles. They are also stable and durable in contact with water and air.

The mechanical properties of the substrates, e.g. the strength and elasticity, are not affected by the treatment.

The surface treatment may be controlled by several factors, notably the length of time of the treatment. Other factors include pressure, vapour flow rate, the power applied, the dimensions of the plasma apparatus and the positioning of the surface with reference to the plasma.

The method is useful for treating articles such as filters, heat exchangers, food processing equipment, medical implants and underwater structures.

The invention is illustrated by but not limited with reference to the following examples.

EXAMPLE 1

General Procedure

Surfaces were treated on 22 mm diameter discs of various materials by exposing the discs for 1 hour in a plasma reactor. The plasma reactor was a 45 mm diameter Pyrex glass tube continuously evacuated through 40 mm diameter tubing by a mechanical rotary pump to a background pressure of less than 0.01 Torr. Ethylene glycol vapour was introduced into the reactor at a pressure of 0.05 Torr and the plasma generated in the vapour using an RF power supply (13.56 MHz) inductively coupled to the plasma via a coil wrapped around the reactor tube either at, or 10 cm upstream of, the sample position. The plasma was run at an RF power of 1 Watt.

The treated discs were fixed onto a 5 cm disc, immersed in 1 liter of liquid containing a foulant, and the disc was spun at a constant speed for 15 minutes. The treated discs were then removed, and the amount of foulant assessed. Comparative tests were performed with materials not subjected to plasma treatment.

Glass discs were cleaned sequentially in methanol, toluene, water and dried.

Some discs were then rendered hydrophobic by immersion in a 2% solution of dichloro-dimethyl silane in dichloromethane.

Other discs were used as substrates for ethylene glycol plasma treatment by the method described above.

The discs were then treated with a foulant by the above procedure at 0°–8° C. The foulant was tank bottom beer from a commercial brewery.

For this foulant, the amount of deposition was monitored by immersing the discs in a protein stain in order to colour deposited protein and measuring the absorbance of light with a Beckmann Model 25 spectrophotometer. In each case, an unfouled but otherwise identically treated sample was placed in the spectrometer reference beam.

After fouling, the relative increases in absorbances on the cleaned, hydrophobised and plasma treated surfaces were in the ratio 15:24:2 respectively. The deposition level increases with the increase in absorbance.

EXAMPLE 2

Various materials were treated with ethylene glycol plasma by the method described in Example 1 and tested for anti-fouling activity by the method described in Example 1 but using a different foulant.

The foulant was a protein solution containing $0.1\mu$ Cidm$^{-3}$ of carbon-14 methylated radio labelled bovine serum albumin (ex Amersham International, specific activity $42\mu$ Ci/mg) and 2.7 mg dm$^{-3}$ of unlabelled bovine serum albumin (Sigma Chemical Co), the solution containing 0.01 mol dm$^{-3}$ of NaH$_2$PO$_4$ and the pH being adjusted to 7.2 with NaOH.

The extent of fouling was assessed by a "normalised fouling level" (NFL) defined as $$NFL = 10^3 \times \frac{\text{Count rate detected from the disc surface}}{\text{Count rate detected from 1 ml of foulant solution}}$$

A Packard Scintillation counter type TriCarb 460CD was used to detect the foulant mixture activity, a Panax Nucleonics Ltd., type LC5, radiation detector was used to measure surface activity. Background radiation levels were substracted from all readings. The results set out in the following table were obtained.

| Material | NFL of Untreated Material | NFL of Plasma Treated Material |
|---|---|---|
| Cleaned Glass | 37 | 5 |
| Nitrocellulose, capillary pore membrane (ex Nucleopore) | 55 | 4 |
| Tortuous pore membrane of polyvinylidene difluoride (ex Millipore) | 36 | 3 |
| Cast film of polyetherimide (ex GEC) | 37 | 7 |
| Cast film of Nylon | 37 | 10 |

EXAMPLE 3

Example 2 was repeated with glass discs, using as foulant an aqueous dispersion of 20$\mu$l of radio labelled oleyl oleate and 2$\mu$l of oleic acid in 1 dm$^3$ of water, the solution containing 0.01 mol dm$^{-3}$ NaH$_2$PO$_4$ and the pH being adjusted to 7.2 by the addition of concentrated NaOH.

The NFL of the solvent cleaned glass was 1.9 and that of the plasma treated glass was 0.3.

By way of further comparison, a glass disc was coated with a film cast from a solution of polyetherimide in dichloromethane and similarly fouled. The NFL of this test piece was 2.2.

EXAMPLE 4

Further compounds were tested using the same general procedure previously described, with variations in the treatments times, plasma pressure and plasma power.

The foulant was the same protein solution as that disclosed in Example 2.

The material to be treated was a cast film of polyetherimide.

The Packard Scintillation counter TriCarb 460CD was used to detect the foulant activity. A Cirtronics Instruments Model 8010 was used to measure surface activity. Background radiation levels were substracted from all readings.

The results set out in the following Table were obtained.

| Plasma Type | Treatment Time (Mins) | Partial Pressure (Torr) | Plasma Power (w) | Fouling Propensity NFL |
|---|---|---|---|---|
| Blank | — | — | — | 42 |
| Ethylene glycol | 5 | 0.018 | 10 | 20 |
| Ethylene glycol | 60 | 0.016 | 10 | 8 |
| Butan-1-ol | 5 | 0.1 | 30 | 20 |
| Butan-1-ol | 60 | 0.1 | 30 | 9 |
| Ethylene glycol-diglycidyl ether | 5 | 0.002 | 10 | 17 |
| Methanol | 5 | 0.1 | 30 | 19 |
| Methanol | 60 | 0.1 | 30 | 10 |
| Glycerol | 5 | 0.1 | 10 | 22 |

EXAMPLE 5

A polyetherimide ultra-filtration membrane of 100,000 nominal molecular weight cut off (NMWCO) was treated with plasma of water vapour under various conditions under the conditions described with reference to Example 4.

The results set out in the following Table were obtained.

| Plasma Type | Treatment Time (Mins) | Partial Pressure (Torr) | Plasma Power (w) | Fouling Propensity NFL |
|---|---|---|---|---|
| Blank | — | — | — | 42 |
| Water | 2 | 0.032 | 5 | 34 |
| Water | 2 | 0.060 | 5 | 29 |
| Water | 2 | 0.010 | 5 | 27 |

We claim:

1. A method for reducing the tendency of a surface of a material to foul when exposed to a potential foulant, said method comprising the step of treating the surface with a plasma of a treating compound containing or generating hydroxyl groups to render the surface hydrophilic but substantially uncharged, said material being selected from the group consisting of glass, ceramics, alumina, steel, carbon, polycarbonate, polyketone, polyester, polyacrylate, polyacrylonitrile, polysulphone, polyether sulphone, polyamide, polyetherimide, polyvinylidene difluoride, cellulose, nitrocellulose and a cellulose ester, said treating compound being a diol, triol, or polyol containing four or less carbon atoms per molecule.

2. A method according to claim 1, wherein the material is in the form of fibers, woven fabrics, film, membrane, plate, disc or tube.

3. A method according to claim 1, wherein the diol is ethylene glycol.

4. A method according to claim 1, wherein the treating compound is a monohydric alcohol containing 1 to 4 carbon atoms per molecule.

5. A method according to claim 1, wherein treatment is effected by placing the material to be treated in an evacuated vessel through which the plasma of the treating compound is passed.

6. A method according to claim 1, wherein the plasma is generated by using direct current, low frequency altenating current or radio frequency or microwave radiation.

* * * * *